(12) United States Patent
Taff et al.

(10) Patent No.: US 9,298,168 B2
(45) Date of Patent: *Mar. 29, 2016

(54) MULTIVIEW 3D WRIST WATCH

(71) Applicant: LEIA INC., Menlo Park, CA (US)

(72) Inventors: Brian Taff, Portland, OR (US); David A. Fattal, Mountain View, CA (US); Raymond G. Beausoleil, Seattle, WA (US)

(73) Assignee: LEIA INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,961

(22) Filed: Jun. 19, 2014

(65) Prior Publication Data

US 2014/0293759 A1     Oct. 2, 2014

Related U.S. Application Data

(63) Continuation of application No. PCT/US2013/024093, filed on Jan. 31, 2013.

(51) Int. Cl.
*G04C 17/00* (2006.01)
*G04C 17/02* (2006.01)
(Continued)

(52) U.S. Cl.
CPC ............ *G04G 9/0035* (2013.01); *G02B 5/1842* (2013.01); *G02B 27/2214* (2013.01); *G02B 27/2242* (2013.01); *G02B 27/2292* (2013.01); *G03H 1/2294* (2013.01)

(58) Field of Classification Search
CPC ......... G04G 9/06; G04G 9/062; G04G 9/067; G04G 9/0094; G02B 5/1842; G03H 1/2294

USPC .................... 368/239; 345/419; 359/242, 567
See application file for complete search history.

(56) References Cited

U.S. PATENT DOCUMENTS

| 5,184,848 | A | * | 2/1993 | Itoh et al. ........................... 283/2 |
| 5,301,062 | A | * | 4/1994 | Takahashi et al. ............ 359/567 |

(Continued)

FOREIGN PATENT DOCUMENTS

| CN | 1213097 A | 4/1999 |
| CN | 1479878 A | 3/2004 |

(Continued)

OTHER PUBLICATIONS

International Search Report and Written Opinion (ISR/WO) of the International Searching Authority (ISA/KR) mail date Dec. 26, 2012 (6 pages) for counterpart PCT patent application No. PCT/US2012/035573 (WO2013162609A1).

(Continued)

*Primary Examiner* — Amy Cohen Johnson
*Assistant Examiner* — Daniel Wicklund
(74) *Attorney, Agent, or Firm* — North Shore Associates; J. Michael Johnson

(57) ABSTRACT

A multiview 3D wrist watch is disclosed. The wrist watch has clock circuitry to determine a time and a plurality of light sources to generate a plurality of input planar lightbeams. A directional backplane having a plurality of directional pixels scatters the plurality of input planar lightbeams into a plurality of directional lightbeams, each directional lightbeam having a direction and angular spread controlled by characteristics of a directional pixel in the plurality of directional pixels. A shutter layer receives the time from the clock circuitry and modulates the plurality of directional lightbeams to generate a 3D time view.

20 Claims, 10 Drawing Sheets

(51) Int. Cl.
| | |
|---|---|
| G04C 19/00 | (2006.01) |
| G04C 19/02 | (2006.01) |
| G02F 1/03 | (2006.01) |
| G02F 1/07 | (2006.01) |
| G02B 5/18 | (2006.01) |
| G02F 1/1335 | (2006.01) |
| G04G 9/00 | (2006.01) |
| G02B 27/22 | (2006.01) |
| G03H 1/22 | (2006.01) |

(56) References Cited

U.S. PATENT DOCUMENTS

| | | | |
|---|---|---|---|
| 5,615,024 A | 3/1997 | May et al. | |
| 5,617,248 A * | 4/1997 | Takahashi et al. | 359/567 |
| 5,721,598 A | 2/1998 | Smith | |
| 5,729,311 A | 3/1998 | Broer et al. | |
| 5,926,294 A | 7/1999 | Sato et al. | |
| 6,158,884 A * | 12/2000 | Lebby et al. | 368/10 |
| 6,437,920 B1 * | 8/2002 | Wohlstadter | 359/626 |
| 6,490,393 B1 | 12/2002 | Zhou | |
| 6,580,529 B1 | 6/2003 | Amitai et al. | |
| 6,667,819 B2 * | 12/2003 | Nishikawa et al. | 359/15 |
| 6,718,093 B2 | 4/2004 | Zhou | |
| 6,980,271 B2 | 12/2005 | Fujishiro | |
| 7,044,628 B2 | 5/2006 | Choi et al. | |
| 7,626,643 B2 | 12/2009 | Ijzerman et al. | |
| 7,742,120 B2 | 6/2010 | Bayley et al. | |
| 7,773,849 B2 | 8/2010 | Shani | |
| 7,859,947 B2 * | 12/2010 | Kawai | 368/10 |
| 7,903,332 B2 | 3/2011 | De Zwart et al. | |
| 8,026,997 B2 | 9/2011 | Feng | |
| 8,681,423 B1 | 3/2014 | Gibson et al. | |
| 8,810,750 B2 | 8/2014 | Mun et al. | |
| 8,915,635 B2 | 12/2014 | Fiorentino et al. | |
| 2002/0008834 A1 | 1/2002 | Suzuki | |
| 2002/0075445 A1 | 6/2002 | Dabrowski et al. | |
| 2003/0086649 A1 | 5/2003 | Zhou | |
| 2004/0130879 A1 | 7/2004 | Choi et al. | |
| 2004/0156182 A1 * | 8/2004 | Hatjasalo et al. | 362/31 |
| 2004/0156589 A1 | 8/2004 | Gunn et al. | |
| 2005/0041174 A1 | 2/2005 | Numata et al. | |
| 2005/0073627 A1 | 4/2005 | Akiyama | |
| 2005/0123229 A1 | 6/2005 | Huck et al. | |
| 2005/0140832 A1 | 6/2005 | Goldman et al. | |
| 2006/0104570 A1 | 5/2006 | Rausch | |
| 2007/0129864 A1 | 6/2007 | Tanaka et al. | |
| 2007/0213955 A1 * | 9/2007 | Ishida et al. | 702/178 |
| 2007/0236801 A1 * | 10/2007 | Cha et al. | 359/642 |
| 2007/0279367 A1 | 12/2007 | Kitai | |
| 2007/0298533 A1 | 12/2007 | Yang et al. | |
| 2008/0204663 A1 | 8/2008 | Balogh | |
| 2008/0204873 A1 | 8/2008 | Daniell | |
| 2008/0285307 A1 | 11/2008 | Aylward et al. | |
| 2009/0016168 A1 * | 1/2009 | Smith | 368/10 |
| 2009/0091837 A1 | 4/2009 | Chao et al. | |
| 2009/0207342 A1 | 8/2009 | Yamaguchi et al. | |
| 2009/0213300 A1 | 8/2009 | Daiku | |
| 2009/0244706 A1 | 10/2009 | Levola et al. | |
| 2009/0290837 A1 | 11/2009 | Chen et al. | |
| 2009/0322986 A1 | 12/2009 | Wei et al. | |
| 2010/0103485 A1 | 4/2010 | Haussler | |
| 2010/0118117 A1 | 5/2010 | Kroll et al. | |
| 2010/0123952 A1 | 5/2010 | Chen et al. | |
| 2010/0207964 A1 | 8/2010 | Kimmel et al. | |
| 2010/0284085 A1 | 11/2010 | Laakkonen | |
| 2010/0289870 A1 | 11/2010 | Leister | |
| 2010/0302803 A1 | 12/2010 | Bita et al. | |
| 2011/0002143 A1 | 1/2011 | Saarikko et al. | |
| 2011/0141395 A1 | 6/2011 | Yashiro | |
| 2011/0149596 A1 | 6/2011 | Lv et al. | |
| 2011/0157667 A1 | 6/2011 | Lacoste et al. | |
| 2011/0182570 A1 | 7/2011 | Yeh | |
| 2011/0254916 A1 | 10/2011 | Fan et al. | |
| 2011/0304784 A1 | 12/2011 | Hirota et al. | |
| 2011/0308445 A1 * | 12/2011 | Avda | 368/228 |
| 2012/0008067 A1 | 1/2012 | Mun et al. | |
| 2012/0013962 A1 * | 1/2012 | Subbaraman et al. | 359/15 |
| 2012/0075698 A1 | 3/2012 | Minami | |
| 2012/0113678 A1 | 5/2012 | Cornelissen et al. | |
| 2012/0120213 A1 | 5/2012 | Ohyama et al. | |
| 2012/0127573 A1 | 5/2012 | Robinson et al. | |
| 2012/0127751 A1 | 5/2012 | Kimmel et al. | |
| 2012/0176665 A1 | 7/2012 | Song et al. | |
| 2012/0249934 A1 * | 10/2012 | Li et al. | 359/567 |
| 2012/0250141 A1 | 10/2012 | Chen | |
| 2012/0281950 A1 | 11/2012 | Fattal et al. | |
| 2013/0057539 A1 | 3/2013 | Kim | |
| 2013/0082980 A1 | 4/2013 | Gruhlke et al. | |
| 2013/0201723 A1 | 8/2013 | Gourlay | |
| 2014/0111856 A1 | 4/2014 | Brug et al. | |
| 2014/0300840 A1 * | 10/2014 | Fattal | G02B 27/2214 349/15 |
| 2014/0300947 A1 | 10/2014 | Fattal et al. | |
| 2014/0300960 A1 | 10/2014 | Santori et al. | |
| 2015/0016777 A1 | 1/2015 | Abovitz et al. | |
| 2015/0036068 A1 | 2/2015 | Fattal et al. | |

FOREIGN PATENT DOCUMENTS

| | | | |
|---|---|---|---|
| CN | 1517760 A | 8/2004 | |
| CN | 202126538 | 1/2012 | |
| JP | 11-326545 A | 11/1999 | |
| JP | 2007033200 A | 2/2007 | |
| JP | 2009053499 A | 3/2009 | |
| JP | 2009288718 A | 12/2009 | |
| JP | 2011029161 A | 2/2011 | |
| WO | 9908257 A1 | 2/1999 | |
| WO | WO 9908257 A1 * | 2/1999 | G04G 9/06 |
| WO | 0242821 A1 | 5/2002 | |
| WO | 2010119426 A2 | 10/2010 | |
| WO | 2012069071 A1 | 5/2012 | |
| WO | 2013162609 A1 | 10/2013 | |
| WO | 2013180725 A1 | 12/2013 | |
| WO | 2013180737 A1 | 12/2013 | |
| WO | 2014120160 A1 | 8/2014 | |
| WO | 2015016844 A1 | 2/2015 | |

OTHER PUBLICATIONS

International Search Report and Written Opinion (ISR/WO) of the International Searching Authority (ISA/KR) mail date Mar. 13, 2013 (8 pages) for counterpart PCT patent application No. PCT/US2012/040305 (WO2013180725A1).

International Search Report and Written Opinion (ISR/WO) of the International Searching Authority (ISA/KR) mail date Mar. 11, 2013 (8 pages) for counterpart PCT patent application No. PCT/US2012/040607 (WO2013180737).

International Search Report and Written Opinion (ISR/WO) of the International Searching Authority (ISA/KR) dated Apr. 29, 2014 (15 pages) for counterpart PCT patent application No. PCT/US2013/052774 (WO2015016844A1).

USPTO Non-final Office Action with mail date Jan. 5, 2015 for U.S. Appl. No. 14/309,601 (15 pages).

Response/Amendment filed Mar. 16, 2015 (13 pages) for U.S. Appl. No. 14/309,601 in response to non-final Office Action with mail date Jan. 5, 2015.

USPTO Final Office Action with mail date Apr. 9, 2015 for U.S. Appl. No. 14/309,601 (15 pages).

USPTO Non-final Office Action with mail date Jan. 30, 2015 for U.S. Appl. No. 14/309,532 (15 pages).

Response/Amendment filed Apr. 28, 2015 (19 pages) for U.S. Appl. No. 14/309,532 in response to non-final Office Action with mail date Jan. 30, 2015.

USPTO Non-final Office Action with mail date Dec. 4, 2014 for U.S. Appl. No. 14/309,005 (10 pages).

Response/Amendment filed Feb. 14, 2015 (17 pages) for U.S. Appl. No. 14/309,005 in response to non-final Office Action with mail date Dec. 4, 2014.

USPTO Non-final Office Action with mail date Oct. 16, 2014 for U.S. Appl. No. 14/308,689 (9 pages).

(56) References Cited

OTHER PUBLICATIONS

Response/Amendment filed Dec. 22, 2014 (18 pages) for U.S. Appl. No. 14/308,689 in response to non-final Office Action with mail date Oct. 16, 2014.
USPTO Notice of Allowance and Fee(s) Due& Notice of Allowability with mail date Apr. 17, 2015 for U.S. Appl. No. 141308,689 (7 pages).
International Search Report and Written Opinion (ISR/WO) of the International Searching Authority (ISA/KR) mail date Oct. 25, 2013 (9 pages) for counterpart PCT patent application No. PCT/US2013/024093.
Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.
Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.
Son et al., "Three-Dimensional Imaging Methods Based on Multiview Images," IEEE/OSA Journal of Display Technology, Sep. 2005, pp. 125-140, vol. 1, No. 1.
Travis et al., "Collimated light from a waveguide for a display backlight," Optics Express, Oct. 2009, pp. 19714-19719, vol. 17, No. 22.
Xu et al., "Computer-Generated Holography for Dynamic Display of 3D Objects with Full Parallax," International Journal of Virtual Reality, 2009, pp. 33-38, vol. 8, No. 2.
Fattal et al., "A multi-directional backlight for a wide-angle, glasses-free three-dimensional display," Nature, Mar. 21, 2013, pp. 348-351, vol. 495, Macmillan Publishers Limited, 2013.

\* cited by examiner

MULTIVIEW 3D WRIST WATCH

CROSS-REFERENCE TO RELATED APPLICATIONS

This application is a continuation application of and claims the benefit of priority to prior International Application No. PCT/US2013/024093, filed Jan. 31, 2013, the entire contents of which is incorporated herein by reference.

STATEMENT REGARDING FEDERALLY SPONSORED RESEARCH OR DEVELOPMENT

N/A

BACKGROUND

Wrist watches have been a part of human culture and attire for quite a few decades, having first become popular in the 1920s. The first few models were simply pocket watches held in place by a strap out of necessity during times of war. Soldiers found it impractical to pull a watch from their pockets in the middle of a battle and started relying on wrist watches more frequently. As wrist watches became popular, their designs improved and evolved over time. Initial designs were entirely mechanical. The next generation models employed electronic mechanisms with quartz oscillators. Digital watches became an item in the 1970s, and since then, various models have surfaced to increase consumer demand, including calculator watches, waterproof watches, camera watches, GPS watches, and so on. Current fashion trends indicate that wrist watches are experiencing a comeback after losing some ground to smart phones and other devices.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
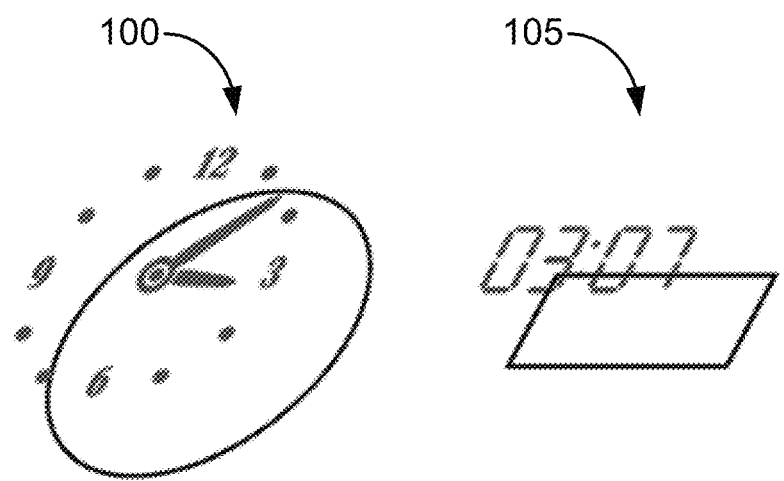
FIG. 1 illustrates schematic diagrams of wrist watches designed in accordance with various examples.

A multiview 3D wrist watch is disclosed. The multiview 3D wrist watch is capable of displaying time in 3D such that a user may view time as if floating in space. The wrist watch employs a unique directional backplane that is used to provide a light field in the form of directional lightbeams. The directional lightbeams are scattered by a plurality of directional pixels in the directional backplane. Each directional lightbeam originates from a different directional pixel and has a given direction and angular spread based on characteristics of the directional pixel. This pointed directionality enables directional beams to be modulated (i.e., turned on, off or changed in brightness) using a plurality of modulators and generate different 3D time views.

In various examples, the directional pixels are arranged in a directional backplane that is illuminated by a plurality of input planar lightbeams. The directional pixels receive the input planar lightbeams and scatter a fraction of them into directional lightbeams. A shutter layer is placed above the directional pixels to modulate the directional lightbeams as desired. The shutter layer may include a plurality of modulators with active matrix addressing (e.g., Liquid Crystal Display ("LCD") cells, MEMS, fluidic, magnetic, electrophoretic, etc.), with each modulator modulating a single directional lightbeam from a single directional pixel or a set of directional lightbeams from a set of directional pixels. The shutter layer enables 3D time views to be generated, with each view provided by a set of directional lightbeams. The 3D time views may be in a single color or multiple colors as desired.

In various examples, the directional pixels in the directional backplane have patterned gratings of substantially parallel grooves arranged in or on top of the directional backplane. The directional backplane may be, for example, a slab of transparent material that guides the input planar lightbeams into the directional pixels, such as, for example, Silicon Nitride ("SiN"), glass or quartz, plastic, Indium Tin Oxide ("ITO"), among others. The patterned gratings can consist of grooves etched directly in or made of material deposited on top of the directional backplane (e.g., any material that can be deposited and etched or lift-off, including any dielectrics or metal). The grooves may also be slanted.

As described in more detail herein below, each directional pixel may be specified by a grating length (i.e., dimension along the propagation axis of the input planar lightbeams), a grating width (i.e., dimension across the propagation axis of the input planar lightbeams), a groove orientation, a pitch, and a duty cycle. Each directional pixel may emit a directional lightbeam with a direction that is determined by the groove orientation and the grating pitch and with an angular spread that is determined by the grating length and width. By using a duty cycle of or around 50%, the second Fourier coefficient of the patterned gratings vanishes thereby preventing the scattering of light in additional unwanted directions. This insures that only one directional lightbeam emerges from each directional pixel regardless of its output angle.

As further described in more detail herein below, a directional backplane can be designed with directional pixels that have a certain grating length, a grating width, a groove orientation, a pitch and a duty cycle that are selected to produce a given 3D time view. The 3D time view is generated from the directional lightbeams emitted by the directional pixels and modulated by the shutter layer, with modulated directional lightbeams from a set of directional pixels generating a given time view.

It is appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Referring now to FIG. 1, schematic diagrams of wrist watches designed in accordance with various examples is described. Wrist watch 100 is a multiview 3D watch that displays time in a circular-like display with numbers placed around the display. Wrist watch 105 is a multiview 3D watch that displays time in a rectangular-like display with number digits indicating the time. Both wrist watches 100-105 show time in 3D time views such that a user may see time as if floating in space. Depending on the position of the user's eyes, a different time view may be perceived by the user; that is, the user views time in a natural and real manner much like the brain perceives visual information in 3D in the real world.

It is appreciated that the time views shown in wrist watches 100 and 105 may be of a single or multiple colors as desired. It is also appreciated that the 3D time views may be of different shapes, have different effects, and include other imagery besides the time. For example, the 3D time views may be shaded, outlined, patterned, and so on. The wrist watch displays may be rectangular, circular, polygonal, or any other shape that may be designed for a wrist watch. The time views may also include a logo for the wrist watch, background pictures, and other pictures to complement the time displayed. As described below, the 3D time views are generated with a unique directional backplane capable of generating directional lightbeams that are modulated by a shutter layer according to the time to be displayed in the 3D time view (e.g., 8:13 am, 10:34 pm, etc.).

Figure 2:
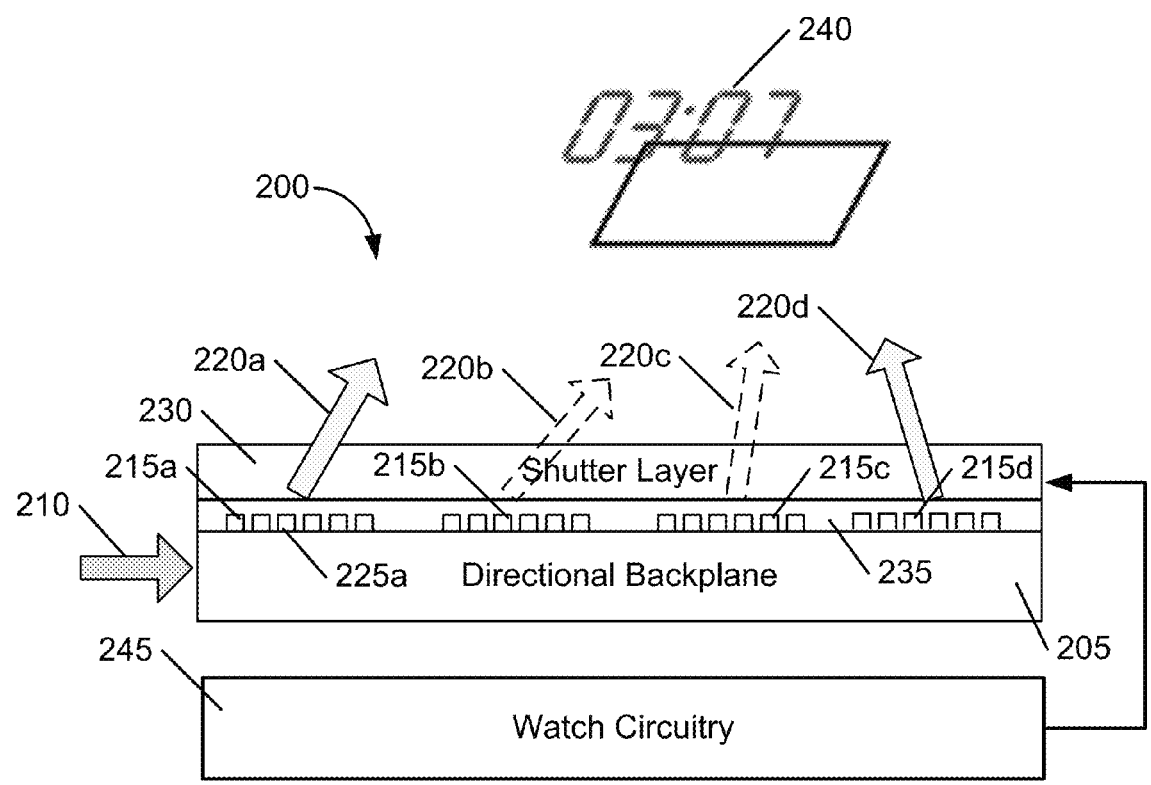
FIG. 2 illustrates a schematic diagram of a wrist watch with a directional backplane in accordance with various examples.

Referring now to FIG. 2, a schematic diagram of a wrist watch with a directional backplane in accordance with various examples is described. Wrist watch 200 includes a directional backplane 205 that receives a set of input planar lightbeams 210 from a plurality of light sources. The plurality of light sources may include, for example, one or more narrow-bandwidth light sources with a spectral bandwidth of approximately 30 nm or less, such as Light Emitting Diodes ("LEDs"), lasers (e.g., hybrid lasers), or any other light source used to provide illumination in a wrist watch. The input planar lightbeams 210 propagate in substantially the same plane as the directional backplane 205, which is designed to be substantially planar.

The directional backplane 205 may consist of a slab of a transparent material (e.g., SiN, glass or quartz, plastic, ITO, etc.) having a plurality of directional pixels 215a-d arranged in or on top of the directional backplane 205. The directional pixels 215a-d scatter a fraction of the input planar lightbeams 210 into directional lightbeams 220a-d. In various examples, each directional pixel 215a-d has patterned gratings of substantially parallel grooves, e.g., grooves 225a for directional pixel 215a. The thickness of the grating grooves can be substantially the same for all grooves resulting in a substantially planar design. The grooves can be etched in the directional backplane or be made of material deposited on top of the directional backplane 205 (e.g., any material that can be deposited and etched or lift-off, including any dielectrics or metal).

Each directional lightbeam 220a-d has a given direction and an angular spread that is determined by the patterned grating forming the corresponding directional pixel 215a-d. In particular, the direction of each directional lightbeam 220a-d is determined by the orientation and the grating pitch of the patterned gratings. The angular spread of each directional lightbeam is in turn determined by the grating length and width of the patterned gratings. For example, the direction of directional lightbeam 215a is determined by the orientation and the grating pitch of patterned gratings 225a.

It is appreciated that this substantially planar design and the formation of directional lightbeams 220a-d from input planar lightbeams 210 requires gratings having a substantially smaller pitch than traditional diffraction gratings. For example, traditional diffraction gratings scatter light upon illumination with lightbeams that are propagating substantially across the plane of the grating. Here, the gratings in each directional pixel 215a-d are substantially on the same plane as the input planar lightbeams 210 when generating the directional lightbeams 220a-d.

The directional lightbeams 220a-d are precisely controlled by characteristics of the gratings in directional pixels 215a-d including a grating length L, a grating width W, a groove orientation θ, and a grating Λ. In particular, the grating length L of grating 225a controls the angular spread ΔΘ of the directional lightbeam 220a along the input light propagation axis and the grating width W controls the angular spread ΔΘ of the directional lightbeam 220a across the input light propagation axis, as follows:

$$\Delta\Theta \approx \frac{4\lambda}{\pi L}\left(\frac{4\lambda}{\pi W}\right) \quad \text{(Eq. 1)}$$

where λ is the wavelength of the directional lightbeam 220a. The groove orientation, specified by the grating orientation angle θ, and the grating pitch Λ or grating period control the direction of the directional lightbeam 220a.

The grating length L and the grating width W can vary in size in the range of 0.1 to 200 μm. The groove orientation angle θ and the grating pitch Λ may be set to satisfy a desired direction of the directional lightbeam 220a, with, for example, the groove orientation angle θ on the order of −40 to +40 degrees and the grating pitch Λ on the order of 200-700 nm.

In various examples, a shutter layer 230 (e.g., LCD cells) is positioned above the directional pixels 215a-d to modulate the directional lightbeams 220a-d scattered by the directional pixels 215a-d. Modulation of directional lightbeams 220a-d involves controlling their brightness with the shutter layer 230 (e.g., turning them on, off, or changing their brightness). For example, modulators in the shutter layer 230 may be used to turn on directional lightbeams 220a and 220d and turn off directional lightbeams 220b and 220c.

The ability to provide modulation for the directional lightbeams 220a-d enables many different 3D time views to be generated, such as time view 240. The modulators are controlled by clock circuitry 245, which determines the time to be displayed in the wrist watch 200 and therefore determines which directional lightbeams 220a-d to be turned on or off to produce the time view 240 corresponding to the time to be displayed in the watch 200 (e.g., 03:07 am).

The shutter layer 230 may be placed on top of a spacer layer 235, which may be made of a material or simply consist of a spacing (i.e., air) between the directional pixels 215a-d and the modulators of the shutter layer 230. The spacer layer 235 may have a width, for example, on the order of 0-100 μm.

It is appreciated that directional backplane 205 is shown with four directional pixels 215a-d for illustration purposes only. A directional backplane in accordance with various examples can be designed with many directional pixels (e.g., higher than 100), depending on how the directional backplane is used (e.g., in a 3D display screen, in a 3D watch, in a mobile device, etc.). It is also appreciated that the directional pixels may have any shape, including for example, a circle, an ellipse, a polygon, or other geometrical shape.

Figure 3A:
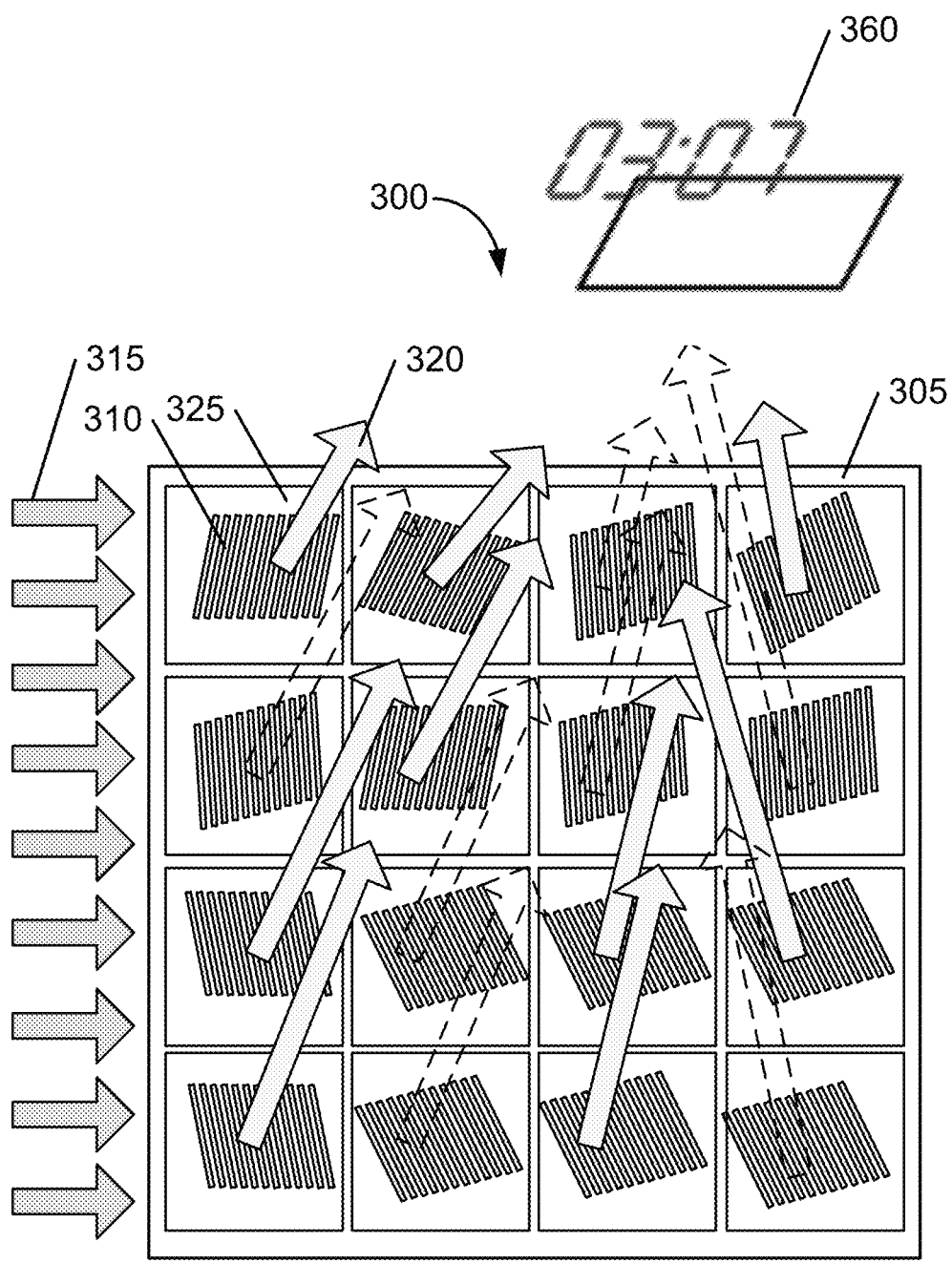
FIGS. 3A-B illustrate example top views of a directional backplane according to FIG. 2.
Figure 3B:
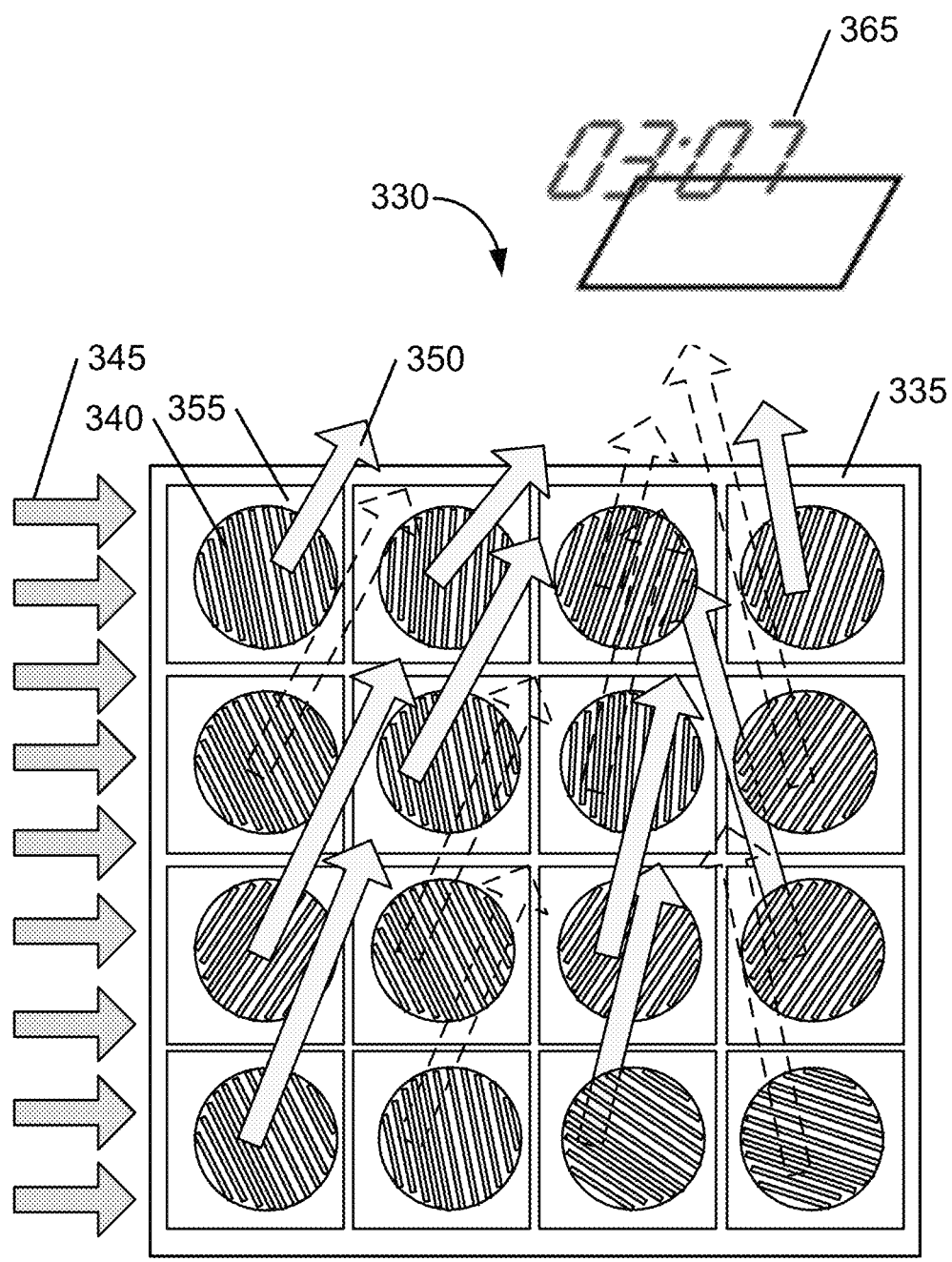

Attention is now directed to FIGS. 3A-B, which illustrate top views of a directional backplane according to FIG. 2. In FIG. 3A, wrist watch 300 is shown with a directional backplane 305 consisting of a plurality of polygonal directional pixels (e.g., directional pixel 310) arranged in a transparent slab. Each directional pixel is able to scatter a portion of the input planar lightbeams 315 into an output directional lightbeam (e.g., directional lightbeam 320). Each directional lightbeam is modulated by a modulator, e.g., LCD cell 325 for directional lightbeam 320. The directional lightbeams scattered by all the directional pixels in the directional backplane 305 and modulated by the modulators (e.g., LCD cell 325) can represent multiple image views that when combined form a 3D time view 360.

Similarly, in FIG. 3B, wrist watch 330 is shown with a directional backplane 335 consisting of a plurality of circular directional pixels (e.g., directional pixel 340) arranged in a transparent slab. Each directional pixel is able to scatter a portion of the input planar lightbeams 345 into an output directional lightbeam (e.g., directional lightbeam 350). Each directional lightbeam is modulated by a modulator, e.g., LCD cell 355 for directional lightbeam 350. The directional lightbeams scattered by all the directional pixels in the directional backplane 335 and modulated by the modulators (e.g., LCD cell 355) can represent multiple image views that when combined form a 3D time view 365.

In various examples, a single modulator may be used to modulate a set of directional lightbeams from a set of directional pixels. That is, a given modulator may be placed above a set of directional pixels instead of having a single modulator per directional pixel as shown in FIGS. 3A-B.

Figure 4A:
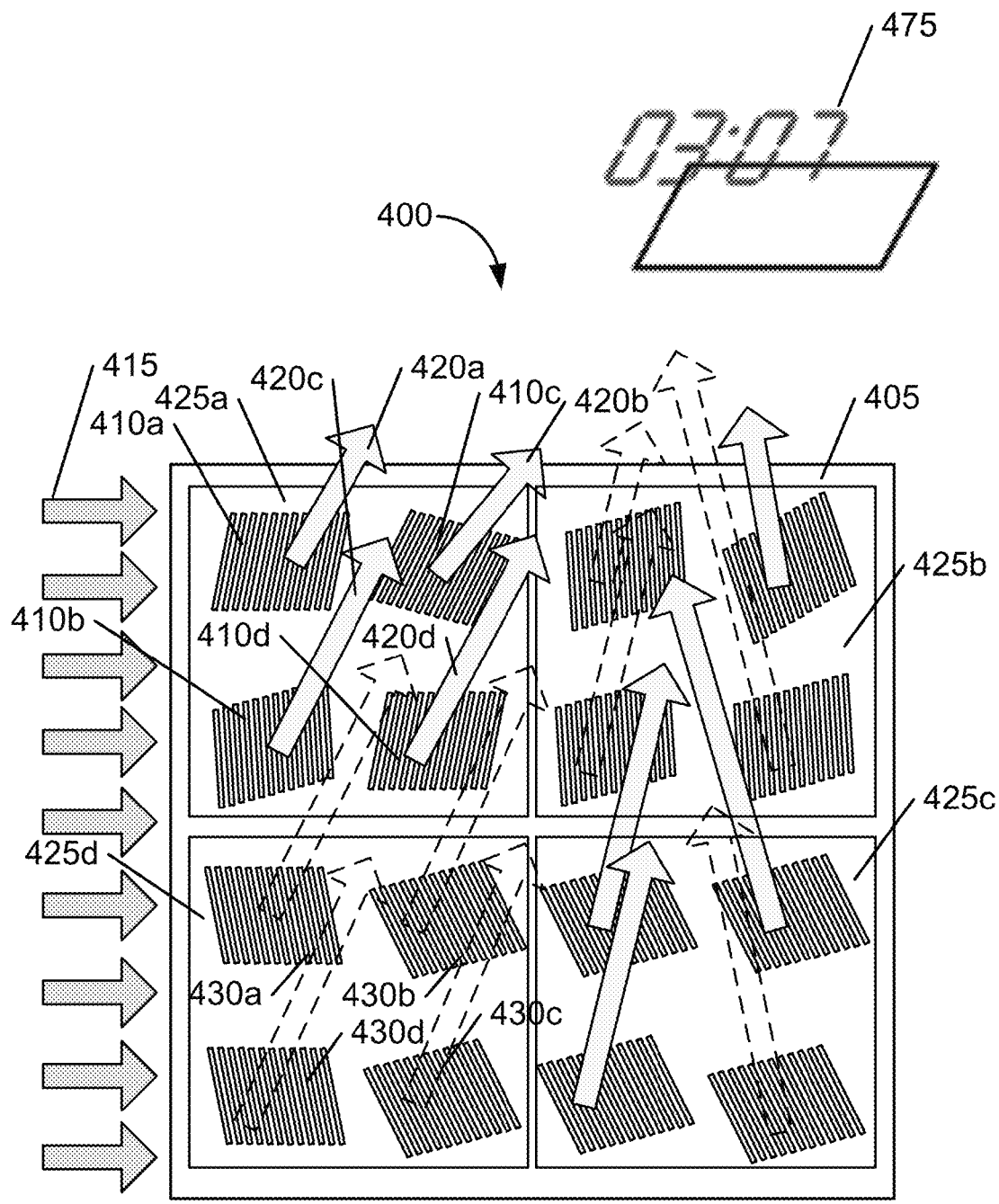
FIGS. 4A-B illustrate other example top views of a directional backplane according to FIG. 2.
Figure 4B:
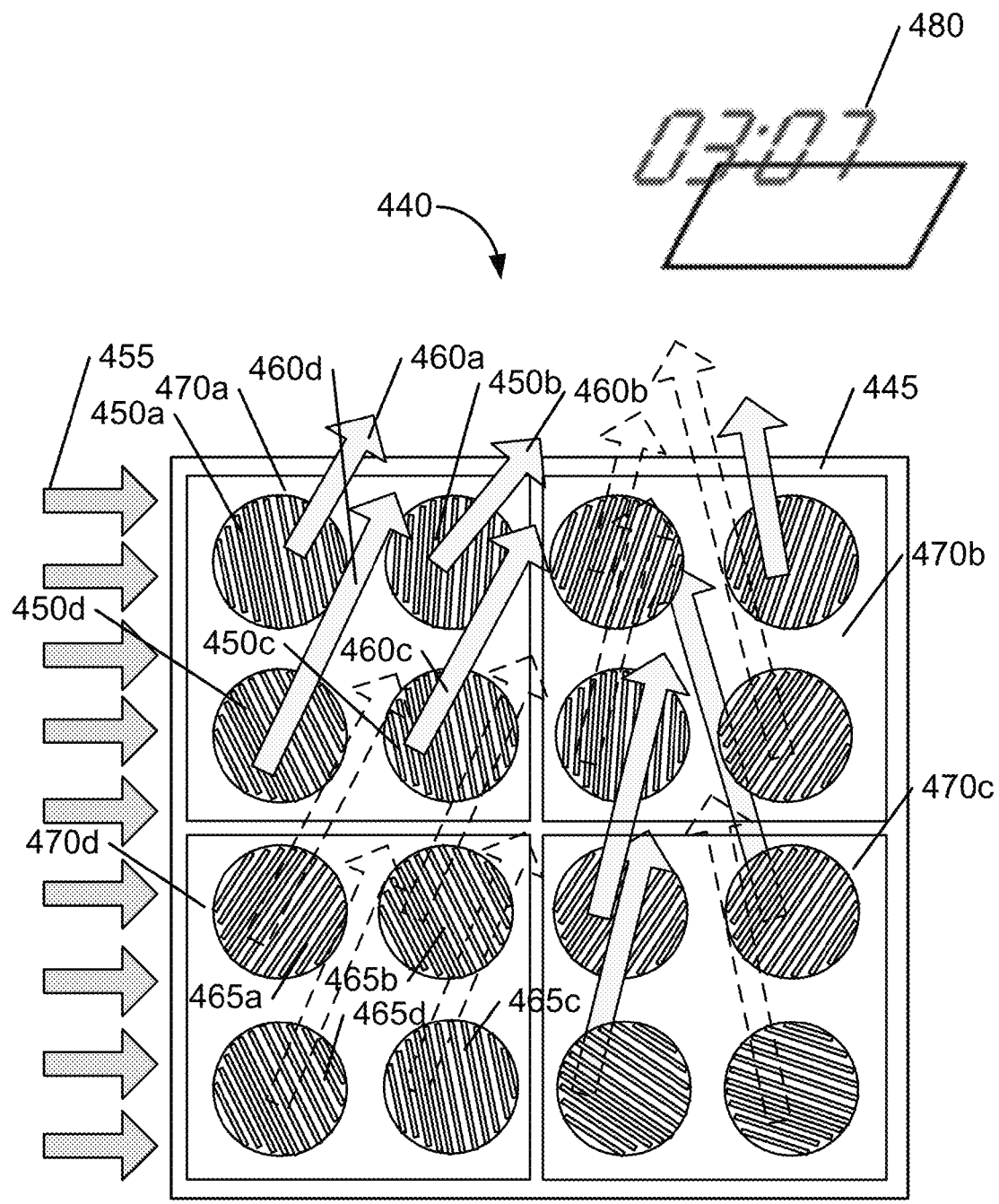

Referring now to FIGS. 4A-B, top views of a directional backplane according to FIG. 2 are described. In FIG. 4A, wrist watch 400 is show with a directional backplane 405 consisting of a plurality of polygonal directional pixels (e.g., directional pixel 410a) arranged in a transparent slab. Each directional pixel is able to scatter a portion of the input planar lightbeams 415 into an output directional lightbeam (e.g., directional lightbeam 420a). A set of directional lightbeams (e.g., directional lightbeams 420a-d scattered by directional pixels 410a-d) is modulated by a modulator (e.g., LCD cell 425a to modulate directional lightbeams 420a-d). For example, LCD cell 425a is used to turn on directional pixels 410a-d while LCD cell 425d is used to turn off directional pixels 430a-d. The directional lightbeams scattered by all the directional pixels in the directional backplane 405 and modulated by the LCD cells 425a-d can represent multiple views that when combined form a 3D time view 475.

Similarly, in FIG. 4B, wrist watch 440 is shown with a directional backplane 445 consisting of a plurality of circular directional pixels (e.g., directional pixel 450a) arranged in a transparent slab. Each directional pixel is able to scatter a portion of the input planar lightbeams 455 into an output directional lightbeam (e.g., directional lightbeam 360a). A set of directional lightbeams (e.g., directional lightbeams 460a-d scattered by directional pixels 450a-d) is modulated by a modulator (e.g., LCD cell 470a to modulate directional lightbeams 460a-d). For example, LCD cell 470a is used to turn on directional pixels 450a-d while LCD cell 470d is used to turn off directional pixels 465a-d. The directional lightbeams scattered by all the directional pixels in the directional backplane 445 and modulated by modulators such as the LCD cells 470a-d can represent multiple views that when combined form a 3D time view 480.

Figure 5:
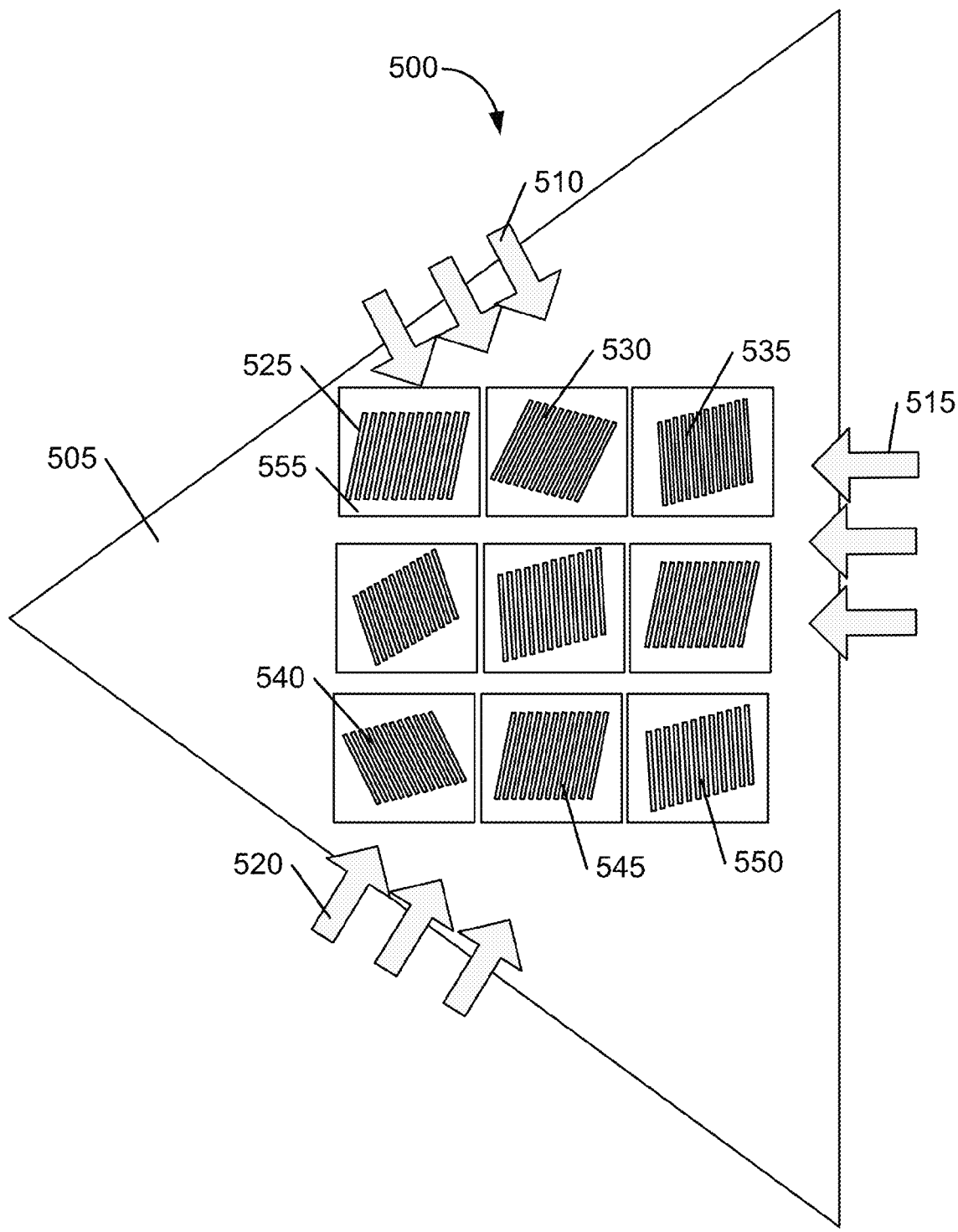
FIG. 5 illustrates an example directional backplane of FIG. 2 having a triangular shape.
Figure 6:
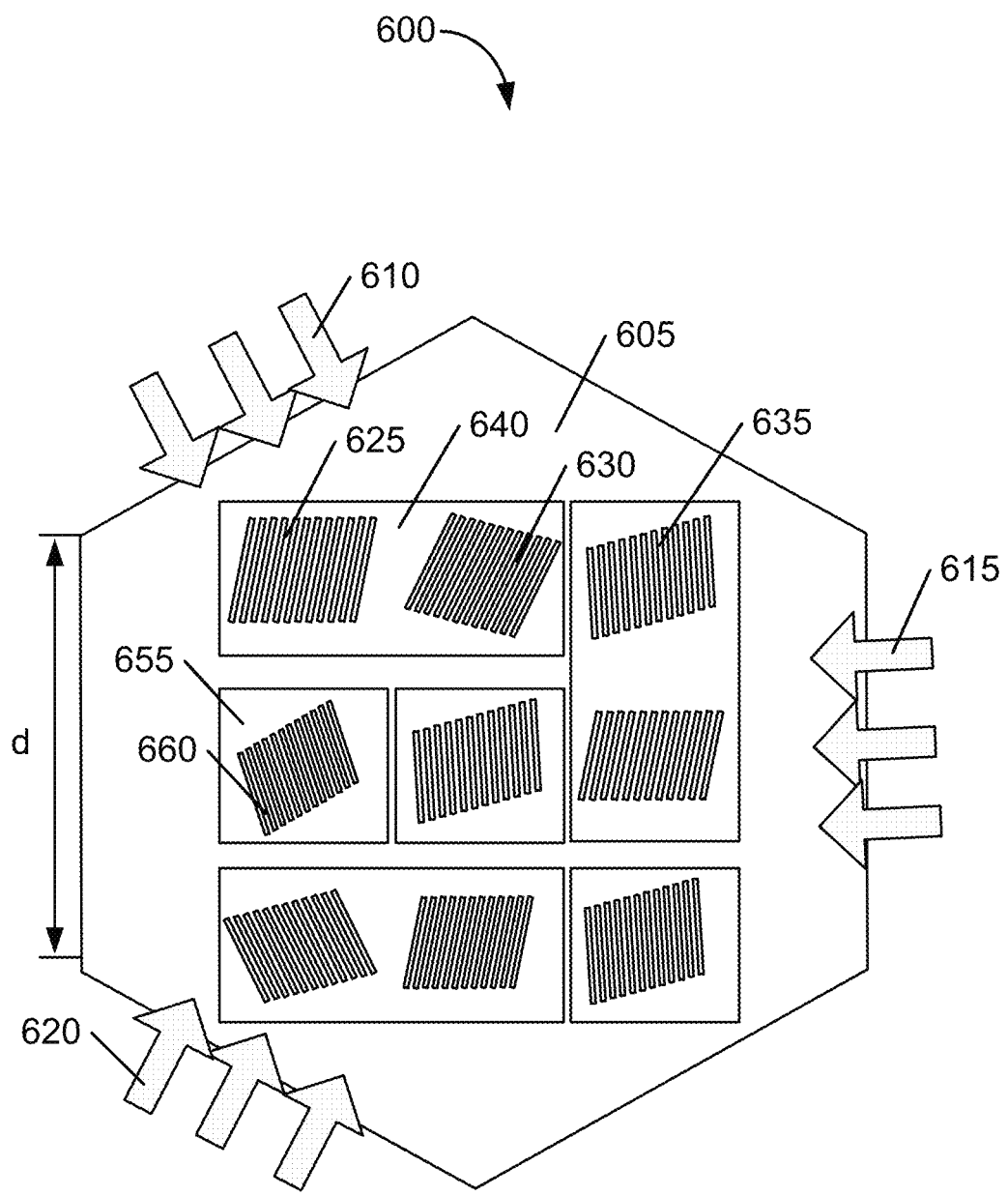
FIG. 6 illustrates an example directional backplane of FIG. 2 having an hexagonal shape.
Figure 7:
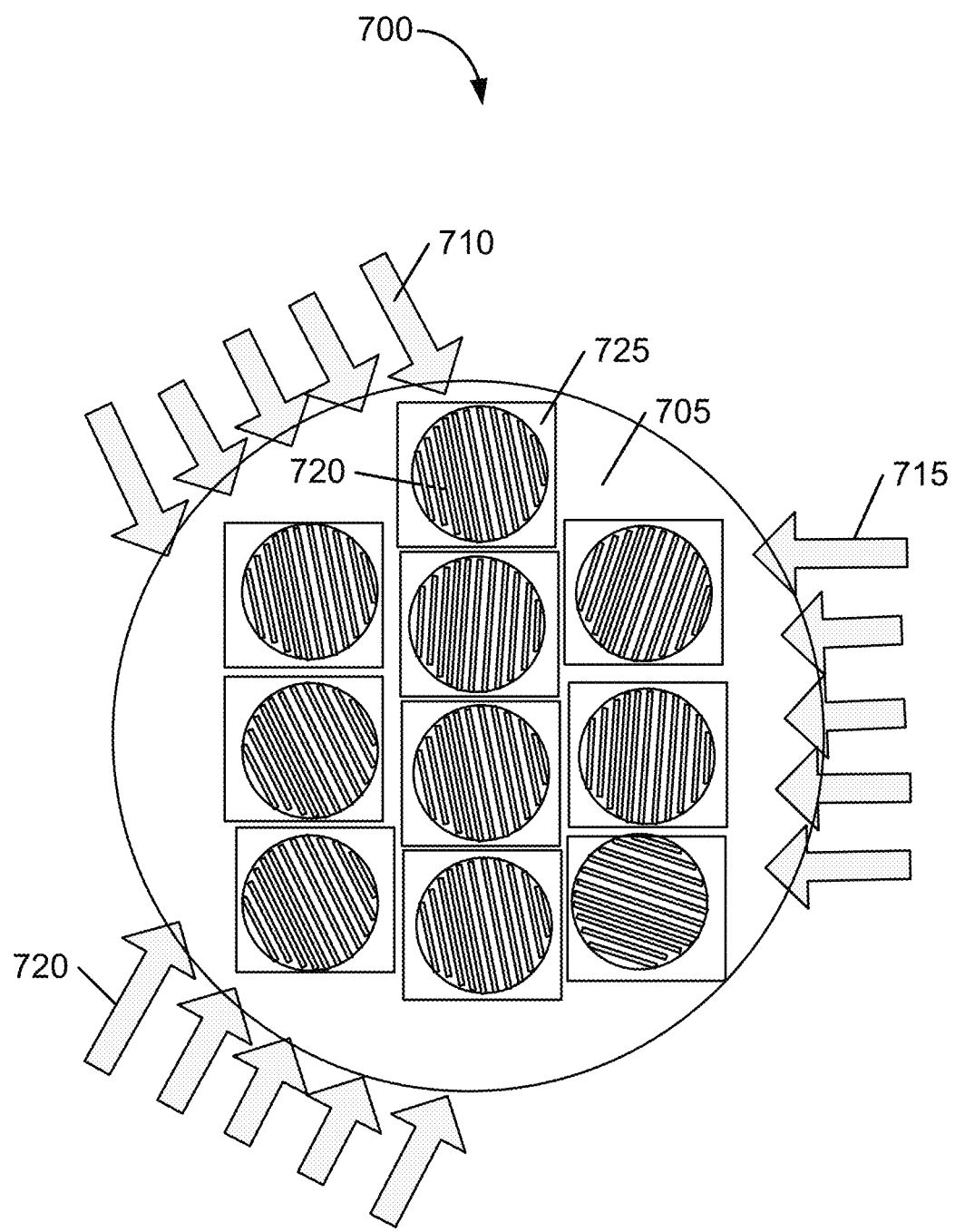
FIG. 7 illustrates an example directional backplane of FIG. 2 having a circular shape.

It is appreciated that a directional backplane may be designed to have different shapes, such as, for example, a triangular shape (as shown in FIG. 5), a hexagonal shape (as shown in FIG. 6), or a circular shape (as shown in FIG. 7). In FIG. 5, the directional backplane 505 receives input planar lightbeams from three different spatial directions, e.g., input planar lightbeams 510-520. This configuration may be used when the input planar lightbeams represent light of different colors, e.g., with input planar lightbeams 510 representing a red color, input planar lightbeams 515 representing a green color, and input planar lightbeams 520 representing a blue color. Each of the input planar lightbeams 510-520 is disposed on a side of the triangular directional backplane 505 to focus their light on a set of directional pixels. For example, the input planar lightbeams 510 is scattered into directional lightbeams by a set of directional pixels 525-535. This subset of directional pixels 525-535 may also receive light from the input planar lightbeams 515-520. However, by design this light is not scattered in the intended view zone of the wrist watch 500.

For example, suppose that input planar lightbeams 510 are scattered by a subset $G_A$ of directional pixels 525-535 into an intended view zone. The intended view zone may be specified by a maximum ray angle $\theta_{max}$ measured from a normal to the directional backplane 504. Input planar lightbeams 510 may also be scattered by a subset of directional pixels $G_B$ 540-550, however those unwanted rays are outside the intended view zone as long as:

$$\sin\theta_{max} \leq \frac{\lambda_A + \lambda_B}{\lambda_A \lambda_B} \sqrt{\left(\frac{n_{eff}^A}{\lambda_A}\right)^2 + \left(\frac{n_{eff}^B}{\lambda_B}\right)^2 - \left(\frac{n_{eff}^A}{\lambda_A}\right)\left(\frac{n_{eff}^B}{\lambda_B}\right)} \quad \text{(Eq. 2)}$$

where $\lambda_A$ is the wavelength of input planar lightbeams 510, $n_{eff}^A$ is the effective index of horizontal propagation of input planar lightbeams 510 in the directional backplane 505, $\lambda_B$ is the wavelength of input planar lightbeams 520 (to be scattered by directional pixels 540-550), and $n_{eff}^B$ is the effective index of horizontal propagation of input planar lightbeams 520 in the directional backplane 505. In case where the effective indices and wavelengths are substantially the same, Equation 2 reduces to:

$$\sin\theta_{max} \leq \frac{n_{eff}}{2} \quad \text{(Eq. 3)}$$

For a directional backplane of refractive index n above 2 with input planar lightbeams propagating near the grazing angle, it is seen that the intended view zone of the display can be extended to the whole space ($n_{eff} \geq 2$ and $\sin\theta_{max} \sim 1$). For a directional backplane of lower index such as glass (e.g., n=1.46), the intended view zone is limited to about $\theta_{max} < \arcsin(n/2)$ (±45° for glass).

It is appreciated that each directional lightbeam may be modulated by a modulator, such as, for example, LCD cell 555. Since precise directional and angular control of directional lightbeams can be achieved with each directional pixel in the directional backplane 505 and the directional lightbeams can be modulated by modulators such as LCD cells, the directional backplane 405 can be designed to generate many different views of 3D images.

It is further appreciated that the directional backplane 505 shown in FIG. 5 may be shaped into a more compact design by realizing that the extremities of the triangular slab can be cut to form a hexagonal shape, as shown in FIG. 6. The directional backplane 605 receives input planar lightbeams from three different spatial directions, e.g., input planar lightbeams 610-620. Each of the input planar lightbeams 610-620 is disposed on alternating sides of the hexagonal directional backplane 605 to focus its light on a subset of directional pixels (e.g., directional pixels 625-635). In various examples, the hexagonal directional backplane 605 has a side length that may range in the order of 10-30 mm, with a directional pixel size in the order of 10-30 μm.

It is appreciated that wrist watch 600 is shown with multiple configurations of modulators. For example, a single modulator may be used to modulate directional lightbeams from a set of directional pixels, e.g., LCD cell 640 for directional pixels 625-635, or a single modulator may be used to modulate a single directional pixel, e.g., LCD cell 655 for directional pixel 660. One skilled in the art appreciates that any configuration of modulators for use with directional pixels may be used to modulate directional lightbeams scattered by the directional pixels. A clock circuitry (not shown) is used to control the modulators in a shutter layer. One skilled in the art also appreciates that any shutter layer configuration may be used to modulate directional lightbeams.

It is also appreciated that the directional backplane for use with color input planar lightbeams can have any geometrical shape besides a triangular (FIG. 5) or hexagonal shape (FIG. 6) as long as light from three primary colors is brought from three different directions. For example, the directional backplane may be a polygon, a circle, an ellipse, or another shape able to receive light from three different directions. Referring now to FIG. 7, a directional backplane having a circular shape is described. Directional backplane 705 in wrist watch 700 receives input planar lightbeams 710-720 from three different directions. Each directional pixel has a circular shape, e.g., directional pixel 720, and scatters a directional lightbeam that is modulated by a modulator, e.g., LCD cell 725. Each LCD cell has a rectangular shape and the circular directional backplane 705 is designed to accommodate the rectangular LCD cells for the circular directional pixels (or for polygonal directional pixels if desired).

Figure 8:
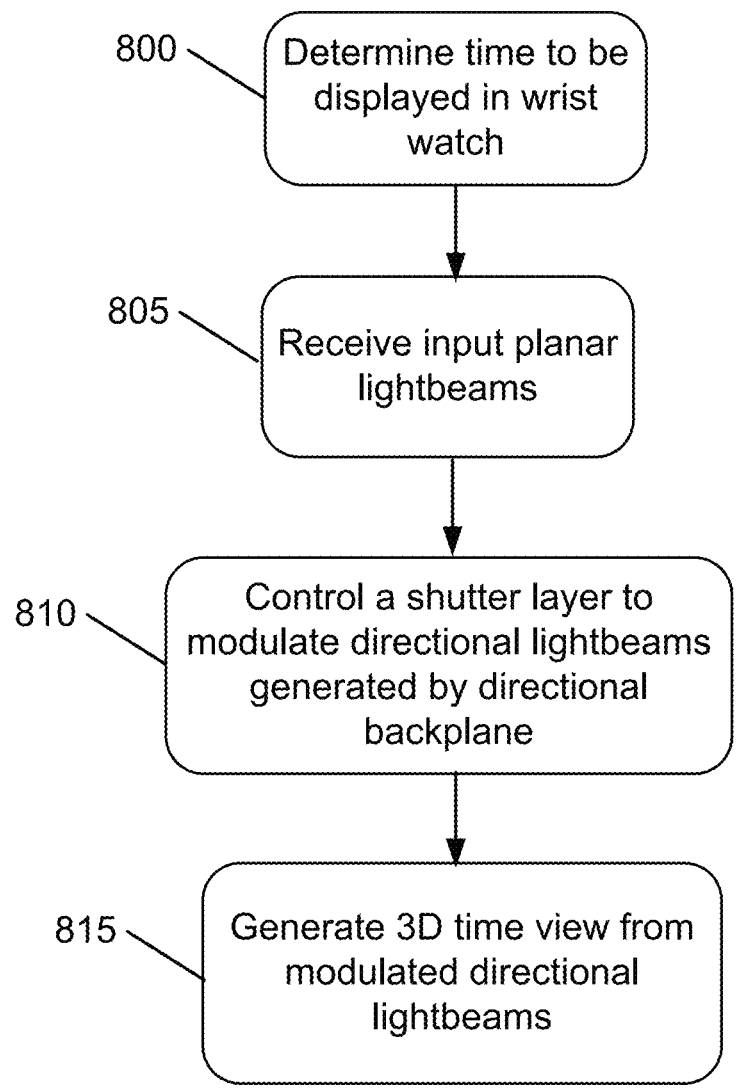
FIG. 8 is a flowchart for generating a 3D time view with a multiview 3D wrist watch in accordance with the present application.

A flowchart for generating a 3D time view with a multiview 3D wrist watch in accordance with the present application is illustrated in FIG. 8. The multiview 3D wrist watch generates 3D time views with a directional backplane and a shutter layer controller by clock circuitry as described above. First, clock circuitry determines a time to be displayed (800). Light from a plurality of narrow-bandwidth light sources is input into the directional backplane in the form of input planar lightbeams (805). The clock circuitry then controls a shutter layer to modulate a set of directional pixels in a directional backplane according to the time to be displayed (810). Lastly, a 3D time view is generated from the modulated directional lightbeams that are scattered by the directional pixels in the directional backplane (815).

Advantageously, the multiview 3D wrist watch enables a 3D time view to be generated so that a user views time as if floating in space. The directional lightbeams generated by the directional pixels can be modulated to produce any desired effect in the generated time views.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A multiview 3D wrist watch, comprising:
    clock circuitry to determine a time;
    a plurality of light sources to generate a plurality of input planar lightbeams;
    a directional backplane configured to guide the plurality of input planar lightbeams, the directional backplane having a plurality of directional pixels configured to scatter a fraction of the guided input planar lightbeams out of a surface of the directional backplane into a plurality of directional lightbeams corresponding to directions of different views of a three-dimensional (3D) image, each directional lightbeam having a direction and angular spread controlled by characteristics of a directional pixel in the plurality of directional pixels; and
    a shutter layer configured to receive the time from the clock circuitry and modulate the plurality of directional lightbeams to generate a 3D time view as the 3D image.

2. The multiview 3D wrist watch of claim 1, further comprising a spacer layer positioned above the directional backplane.

3. The multiview 3D wrist watch of claim 2, wherein the shutter layer is positioned above the spacer layer.

4. The multiview 3D wrist watch of claim 1, wherein the directional backplane comprises a slab of transparent material that is substantially planar, the plurality of input planar lightbeams being configured to propagate within a plane of the substantially planar transparent material slab.

5. The multiview 3D wrist watch of claim 1, wherein each directional pixel in the plurality of directional pixels comprises a patterned grating, the patterned grating comprising a plurality of substantially parallel grooves.

6. The multiview 3D wrist watch of claim 5, wherein the characteristics of a directional pixel comprise a grating length, a grating width, a grating orientation, a grating pitch, and a grating duty cycle of the patterned grating.

7. The multiview 3D wrist watch of claim 6, wherein the grating pitch and the grating orientation of the patterned grating control the direction of a directional lightbeam scattered by the directional pixel.

8. The multiview 3D wrist watch of claim 6, wherein the grating length and the grating width of the patterned grating control the angular spread of a directional lightbeam scattered by the directional pixel.

9. The multiview 3D wrist watch of claim 1, wherein the shutter layer comprises a plurality of modulators.

10. The multiview 3D wrist watch of claim 1, wherein the directional backplane comprises a polygonal slab of transparent material, the polygonal slab being one of a triangular slab and a hexagonal slab.

11. The multiview 3D wrist watch of claim 1, wherein the directional backplane comprises a circular slab of transparent material.

12. The multiview 3D wrist watch of claim 1, wherein the plurality of directional pixels comprises a plurality of polygonal directional pixels.

13. The multiview 3D wrist watch of claim 1, wherein the plurality of directional pixels comprises a plurality of circular directional pixels.

14. A method of generating a 3D time view in a multiview 3D wrist watch, the method comprising:
    determining a time to be displayed by the wrist watch;
    guiding a plurality of input planar lightbeams from a plurality of light sources in the wrist watch within a directional backplane comprising a slab of transparent material;
    generating a plurality of directional lightbeams by scattering a fraction of the guided input planar lightbeams out of the transparent material slab using a plurality of directional pixels in the directional backplane, the directional pixels comprising patterned gratings to produce directional lightbeams having a predetermined angle and angular spread corresponding to different predetermined views of a 3D image; and modulating the plurality of directional lightbeams using a shutter layer controlled according to the determined time to provide a 3D time view of the determined time as the 3D image using the modulated directional lightbeams.

15. The method of claim 14, wherein each directional lightbeam has a direction and an angular spread controlled by characteristics of a patterned grating of a directional pixel in a plurality of directional pixels in the directional backplane.

16. A multiview 3D wrist watch comprising:
clock circuitry to determine a time;
a plurality of light sources to generate input planar lightbeams;
a directional backplane comprising a slab of transparent material configured to guide the input planar lightbeams;
a plurality of directional pixels in the directional backplane to scatter a fraction of the input planar lightbeams into a plurality of directional lightbeams, each directional lightbeam having a direction and an angular spread controlled by a characteristic of a directional pixel of the directional pixel plurality; and a shutter layer to receive the time from the clock circuitry and to modulate the plurality of directional lightbeams to provide a 3D time view,
wherein each of the directional pixels comprises a patterned grating, different ones of the modulated directional lightbeams having controlled directions and angular spreads to provide different predetermined views of the 3D time view.

17. The multiview 3D wrist watch of claim 16, wherein the patterned grating comprises a plurality of substantially parallel grooves.

18. The multiview 3D wrist watch of claim 16, wherein the characteristic of a directional pixel comprises one or more of a grating length, a grating width, a grating orientation, a grating pitch, and a grating duty cycle.

19. The multiview 3D wrist watch of claim 16, wherein the characteristic comprises a grating pitch and a grating direction, and wherein the grating pitch and the grating direction are configured to control the direction of a directional light beam.

20. The multiview 3D wrist watch of claim 16, wherein the patterned grating of each directional pixel is configured to produce a single directional lightbeam.

* * * * *